(12) United States Patent
Moseley et al.

(10) Patent No.: US 11,053,834 B2
(45) Date of Patent: Jul. 6, 2021

(54) TRANSPORTATION REFRIGERATION SYSTEM COMPRISING A REFRIGERATION UNIT AND A DIESEL ENGINE

(71) Applicant: Carrier Corporation, Farmington, CT (US)

(72) Inventors: Garrison S. Moseley, Liverpool, NY (US); Benjamin Edward Ferguson, Cazenovia, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 32 days.

(21) Appl. No.: 15/763,397

(22) PCT Filed: Sep. 14, 2016

(86) PCT No.: PCT/US2016/051675
§ 371 (c)(1),
(2) Date: Mar. 26, 2018

(87) PCT Pub. No.: WO2017/058518
PCT Pub. Date: Apr. 6, 2017

(65) Prior Publication Data
US 2018/0266297 A1   Sep. 20, 2018

Related U.S. Application Data

(60) Provisional application No. 62/234,140, filed on Sep. 29, 2015.

(51) Int. Cl.
*F01N 9/00*   (2006.01)
*F01N 3/025*   (2006.01)
(Continued)

(52) U.S. Cl.
CPC ............. *F01N 9/002* (2013.01); *F01N 3/021* (2013.01); *F01N 3/0253* (2013.01);
(Continued)

(58) Field of Classification Search
CPC ...... F01N 13/009; F01N 3/021; F01N 3/0253; F01N 3/0293; F01N 3/103; F01N 3/106;
(Continued)

(56) References Cited

U.S. PATENT DOCUMENTS 6,304,815 B1   10/2001   Moraal et al.
6,981,370 B2   1/2006   Opris et al.
(Continued)

FOREIGN PATENT DOCUMENTS

CN   101519994 A   9/2009
CN   104806365 A   7/2015
(Continued)

OTHER PUBLICATIONS

Machine Translation of WO-2014048528-A1 (Year: 2014).*
(Continued)

*Primary Examiner* — Brandon D Lee
(74) *Attorney, Agent, or Firm* — Cantor Colburn LLP

(57) ABSTRACT

A transport refrigeration system is provided including a refrigeration unit and a diesel engine powering the refrigeration unit. The diesel engine has an exhaust system for discharging engine exhaust from the diesel engine. An exhaust treatment unit is disposed in the diesel engine exhaust system and includes a diesel oxidation catalyst and a diesel particulate filter. An air control valve is configured to control a quantity of air provided to the diesel engine from an air supply fluidly coupled to the diesel engine. A controller is operably coupled to the air control valve. After initiating regeneration of the diesel particulate filter, the controller is configured to operate the system in either a primary regeneration mode or a secondary regeneration in response to a condition monitored within the exhaust treatment unit.

10 Claims, 4 Drawing Sheets

(51) Int. Cl.
*F01N 3/021* (2006.01)
*F01N 3/10* (2006.01)
*F02D 41/02* (2006.01)
*F01N 13/00* (2010.01)
*F01N 3/029* (2006.01)
*F02D 41/00* (2006.01)
*F02D 41/14* (2006.01)
*F25B 31/02* (2006.01)

(52) U.S. Cl.
CPC .......... *F01N 3/0293* (2013.01); *F01N 3/103* (2013.01); *F01N 3/106* (2013.01); *F01N 13/009* (2014.06); *F02D 41/029* (2013.01); *F01N 2430/06* (2013.01); *F01N 2560/06* (2013.01); *F01N 2900/0416* (2013.01); *F01N 2900/08* (2013.01); *F01N 2900/1404* (2013.01); *F02D 41/1446* (2013.01); *F02D 2041/0022* (2013.01); *F02D 2200/0802* (2013.01); *F25B 31/02* (2013.01); *F25B 2327/001* (2013.01); *Y02T 10/40* (2013.01)

(58) Field of Classification Search
CPC .. F01N 9/002; F01N 2430/06; F01N 2560/06; F01N 2900/0416; F01N 2900/08; F01N 2900/1404; F02D 41/029; F02D 2041/0022; F02D 2200/0802; F02D 41/1446; F25B 2327/001; F25B 31/02; Y02T 10/47
See application file for complete search history.

(56) References Cited

U.S. PATENT DOCUMENTS

| | | | |
|---|---|---|---|
| 7,080,511 | B1 | 7/2006 | Bolton et al. |
| 7,395,660 | B2 | 7/2008 | Kogo et al. |
| 7,654,079 | B2 | 2/2010 | Ruth et al. |
| 8,302,385 | B2 | 11/2012 | Sujan |
| 8,336,300 | B2 | 12/2012 | Hepburn et al. |
| 8,438,837 | B2 | 5/2013 | Hermansson et al. |
| 2004/0000139 | A1* | 1/2004 | Kawashima ............ F01N 3/023 60/295 |
| 2004/0144086 | A1 | 7/2004 | Otake et al. |
| 2009/0107118 | A1* | 4/2009 | Ruona .................... F01N 3/035 60/286 |
| 2010/0192548 | A1* | 8/2010 | Irlbeck .................. F01N 3/027 60/287 |
| 2011/0107741 | A1* | 5/2011 | LaRose, Jr. ........... F02D 41/029 60/276 |
| 2012/0017573 | A1 | 1/2012 | Fujii et al. |
| 2013/0081367 | A1 | 4/2013 | Ikeda et al. |
| 2013/0098001 | A1* | 4/2013 | Tai ......................... F01N 3/106 60/274 |
| 2014/0041362 | A1 | 2/2014 | Ulrey et al. |
| 2015/0135680 | A1* | 5/2015 | Ancimer ............... F02D 41/027 60/274 |
| 2016/0363069 | A1* | 12/2016 | Mazzara Bologna .. F01N 3/035 |
| 2017/0043295 | A1* | 2/2017 | Minezawa ................ F01N 3/08 |

FOREIGN PATENT DOCUMENTS

| | | | |
|---|---|---|---|
| EP | 1174612 | A1 | 1/2002 |
| EP | 1450026 | A2 | 8/2004 |
| EP | 1627136 | A1 | 2/2006 |
| EP | 1726806 | A1 | 11/2006 |
| EP | 2581571 | A1 | 4/2013 |
| JP | 2010151058 | A | 7/2010 |
| JP | 2011153617 | A | 8/2011 |
| WO | 2012030273 | A1 | 3/2012 |
| WO | WO-2014048528 | A1 * | 4/2014 ............ F02M 26/43 |
| WO | 2014071961 | A1 | 5/2014 |
| WO | 2015023350 | A1 | 2/2015 |

OTHER PUBLICATIONS

Mayer, A., Lutz, T., Lämmle, C., Wyser, M. et al., "Engine Intake Throttling for Active Regeneration of Diesel Particle Filters," SAE Technical Paper 2003-01-0381, 2003, pp. 1-9, Abstract Only.

PCT ISR Written Opinion; International Application No. PCT/US2016/051675; International Filing Date: Sep. 14, 2016; dated Jan. 24, 2017; pp. 1-8.

PCT Notification of Transmittal of the International Search Report; International Application No. PCT/US2016/051675; International Filing Date: Sep. 14, 2016; dated Jan. 24, 2017; pp. 1-5.

Chinese Office Action; International Application No. 201680056884.X; Application Filing Date: Mar. 29, 2018; dated Dec. 26, 2019; 5 pages.

Russian Office Action; International Application No. 2018108857; Application Filing Date: Sep. 14, 2016; dated Jan. 17, 2020; 7 pages.

Chinese Office Action; International Application No. 201680056884.X; International Filing Date: Mar. 29, 2018; dated Oct. 26, 2020; 11 pages with translation.

* cited by examiner

TRANSPORTATION REFRIGERATION SYSTEM COMPRISING A REFRIGERATION UNIT AND A DIESEL ENGINE

CROSS REFERENCE TO RELATED APPLICATIONS

This application is a National Stage application of PCT/US2016/051675, filed Sep. 14, 2016, which claims the benefit of U.S. Provisional Application No.: 62/234,140, filed Sep. 29, 2015, both of which are incorporated by reference in their entirety herein.

BACKGROUND

The subject matter disclosed herein relates to transportation refrigeration systems. More specifically, the subject matter disclosed herein relates to filtering of exhaust gas from transportation refrigeration systems.

Fruits, vegetables and other perishable items, including meat, poultry and fish, fresh or frozen, are commonly transported in the cargo box of a truck or trailer, or in an intermodal container. Accordingly, it is customary to provide a transportation refrigeration system in operative association with the cargo box for cooling the atmosphere within the cargo box. The transport refrigeration system includes a refrigerant vapor compression system, also referred to as a transport refrigeration unit, and an on-board power unit. The refrigerant vapor compression system typically includes a compressor, a condenser, an expansion device and an evaporator serially connected by refrigerant lines in a closed refrigerant circuit in accord with known refrigerant vapor compression cycles. The power unit includes an engine, typically diesel powered.

The diesel engine, however, produces harmful soot particles that are removed from the exhaust stream via a diesel particulate filter (DPF). The DPF is periodically regenerated, removing the accumulated soot particles from the DPF, either via passive or active means. Passive means using the diesel engine exhaust temperature with a catalyst added to the exhaust stream to raise the exhaust gas temperature to combust the soot particles. Active means using the passive system with the addition of injecting added fuel into the exhaust stream, where the added fuel is oxidized by the catalyst to raise the exhaust gas temperature to combust the soot particles.

Transportation refrigeration systems often operate at low speeds and low loads, which results in exhaust temperature below the catalyst activation temperature, the point at which the catalyst will oxidize hydro carbons. During such conditions, the DPF will not successfully passively or actively regenerate.

BRIEF SUMMARY

According to one embodiment, a transport refrigeration system is provided including a refrigeration unit and a diesel engine powering the refrigeration unit. The diesel engine has an exhaust system for discharging engine exhaust from the diesel engine. An exhaust treatment unit is disposed in the diesel engine exhaust system and includes a diesel oxidation catalyst and a diesel particulate filter. An air control valve is configured to control a quantity of air provided to the diesel engine from an air supply fluidly coupled to the diesel engine. A controller is operably coupled to the air control valve. After initiating regeneration of the diesel particulate filter, the controller is configured to operate the system in either a primary regeneration mode or a secondary regeneration in response to a condition monitored within the exhaust treatment unit.

In addition to one or more of the features described above, or as an alternative, in further embodiments the primary regeneration mode includes injection of additional fuel and includes adjusting a position of the air control valve if the monitored condition is below a predetermined threshold.

In addition to one or more of the features described above, or as an alternative, in further embodiments the secondary regeneration mode includes utilizing an air control valve only.

In addition to one or more of the features described above, or as an alternative, in further embodiments the exhaust treatment unit includes a sensor for monitoring the condition, the sensor being positioned downstream from the diesel oxidation catalyst.

In addition to one or more of the features described above, or as an alternative, in further embodiments the condition within the exhaust treatment unit is a rate of temperature change of exhaust gas located upstream from the diesel particulate filter.

In addition to one or more of the features described above, or as an alternative, in further embodiments the condition within the exhaust treatment unit is a rate of temperature change of exhaust gas output from the diesel oxidation catalyst.

In addition to one or more of the features described above, or as an alternative, in further embodiments if the rate of temperature change is at least equal to about 3° C./s, the controller is configured to operate in the secondary regeneration mode.

In addition to one or more of the features described above, or as an alternative, in further embodiments the condition within the exhaust treatment unit is a temperature of exhaust gas located upstream from the diesel particulate filter.

In addition to one or more of the features described above, or as an alternative, in further embodiments the condition is satisfied if the temperature is at least equal to 450° C.

According to another embodiment, a method of regenerating a diesel particulate filter of an exhaust treatment unit within a transport refrigeration system is provided including initiating regeneration of the diesel particulate filter. A parameter of an exhaust gas upstream from the diesel particulate filter is measured. The diesel particulate filter is regenerated in a primary generation mode if the measured parameter does not satisfy a predetermined condition. The diesel particulate filter is regenerated in a secondary generation mode if the measured parameter satisfies the predetermined condition.

In addition to one or more of the features described above, or as an alternative, in further embodiments measuring the parameter of the exhaust gas includes sensing a temperature of the exhaust gas.

In addition to one or more of the features described above, or as an alternative, in further embodiments measuring the parameter of the exhaust gas further includes calculating a rate of temperature change of the exhaust gas.

In addition to one or more of the features described above, or as an alternative, in further embodiments operation in the primary regeneration mode includes injection fuel upstream of the diesel particulate filter.

In addition to one or more of the features described above, or as an alternative, in further embodiments operation in the secondary regeneration mode includes adjusting a position of an air control valve.

These and other advantages and features will become more apparent from the following description taken in conjunction with the drawings.

BRIEF DESCRIPTION OF THE DRAWINGS

The foregoing and other features, and advantages are apparent from the following detailed description taken in conjunction with the accompanying drawings in which.

Figure 1:
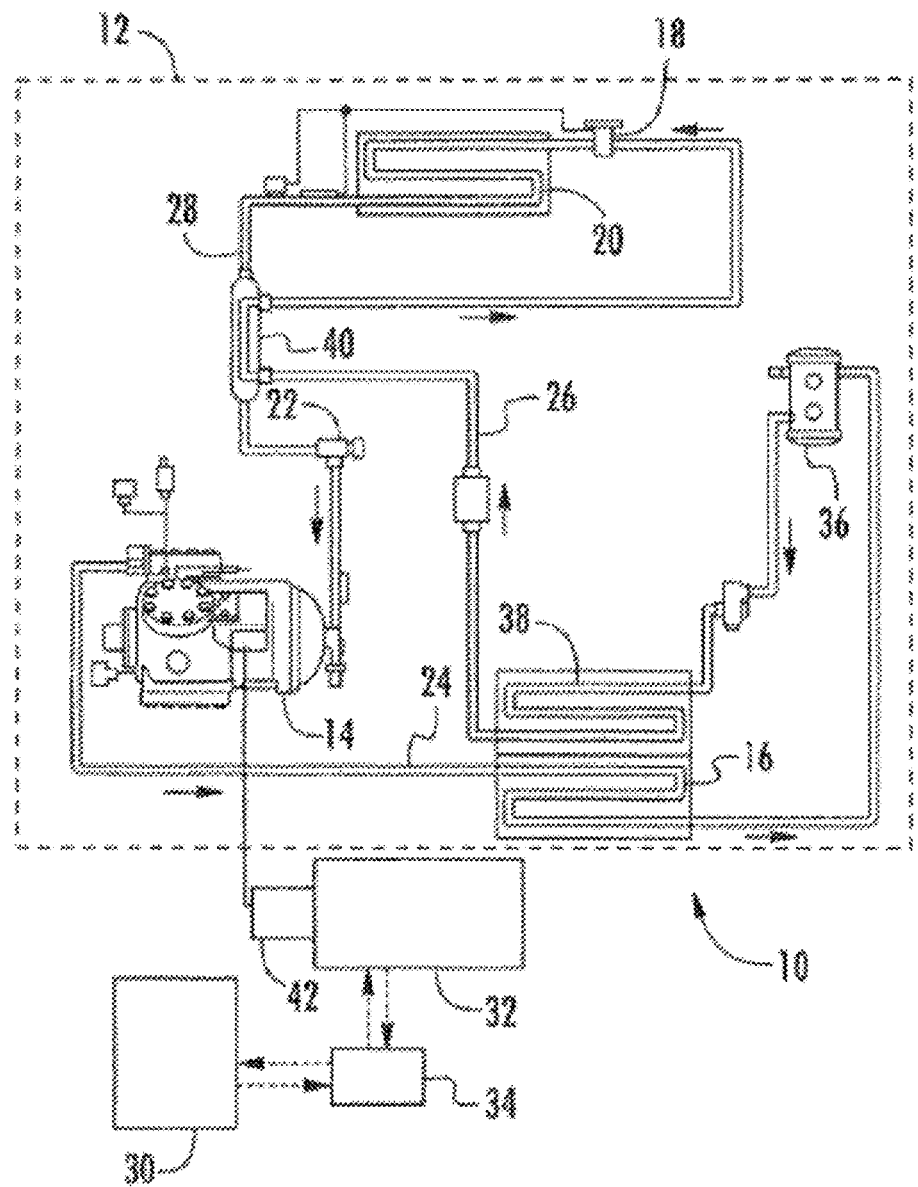
FIG. 1 is a schematic view of an embodiment of a transport refrigeration system.

The detailed description explains embodiments, together with advantages and features, by way of example with reference to the drawing.

DETAILED DESCRIPTION

Figure 2:
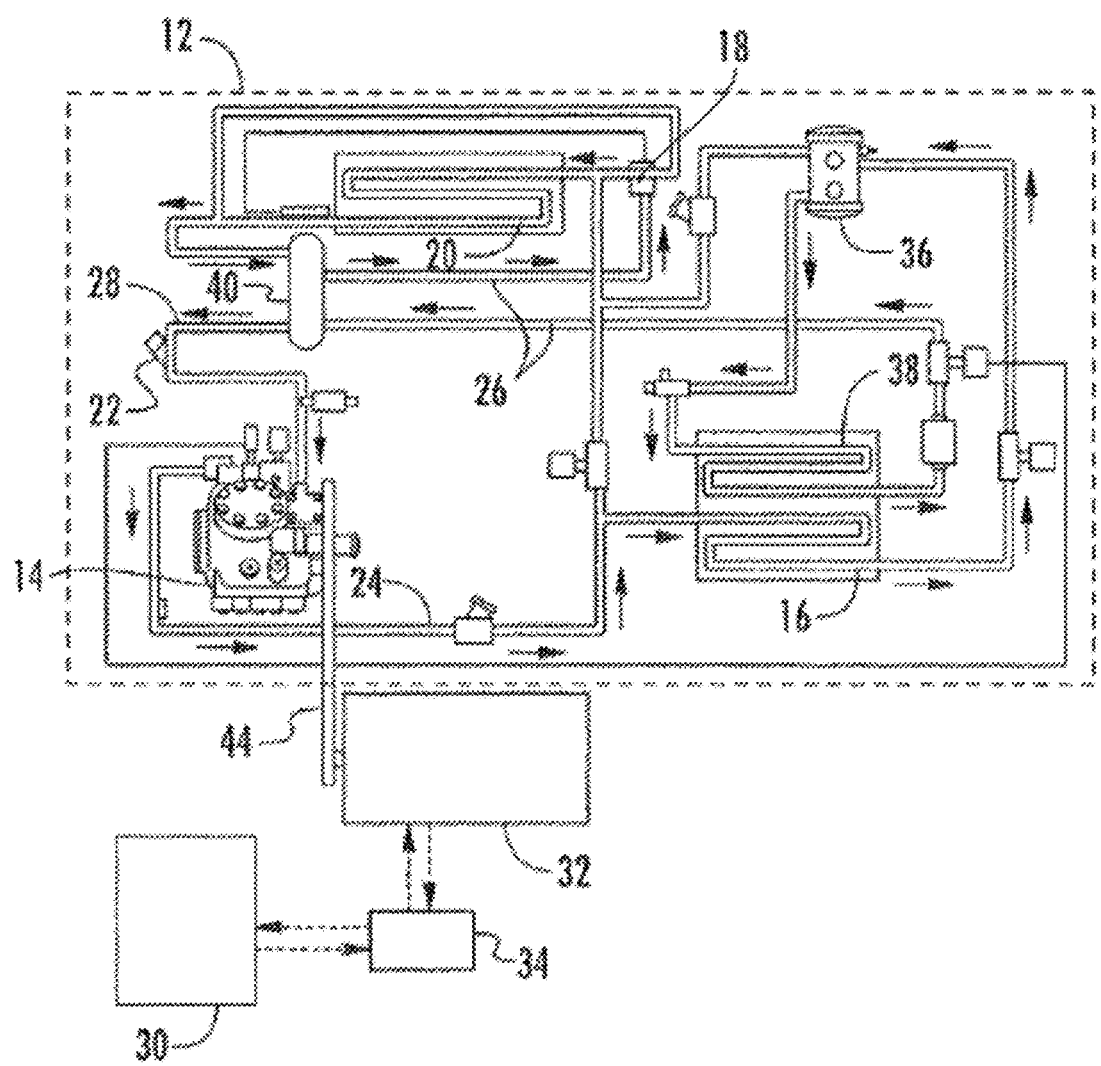
FIG. 2 is a schematic view of another embodiment of a transport refrigeration system.

Referring initially to FIGS. 1 and 2, there are depicted exemplary embodiments of transport refrigeration systems for controlling the temperature of the atmosphere within the cargo box of a truck, trailer, container, intermodal container or similar cargo transportation unit. The transportation refrigeration system 10 includes a transport refrigeration unit 12 including a compressor 14, a refrigerant condenser heat exchanger 16, an expansion device 18, a refrigerant evaporator heat exchanger 20 and a suction modulation valve 22 connected in a closed loop refrigeration circuit including refrigerant lines 24, 26 and 28 and arranged in a conventional refrigeration cycle. The transport refrigeration system 10 further includes an electronic system controller 30, a diesel engine 32 and an engine controller 34. The transport refrigeration system 10 is mounted as in conventional practice to an exterior wall of the truck, trailer or container with the compressor 14 and the condenser heat exchanger 16 with its associated condenser fan(s) (not shown) and diesel engine 32 disposed externally of the refrigerated cargo box.

As is conventional practice, when the transport refrigeration unit 12 is operating in a cooling mode, low temperature, low pressure refrigerant vapor is compressed by the compressor 14 to a high pressure, high temperature refrigerant vapor and passed from the discharge outlet of the compressor 14 into refrigerant line 24. The refrigerant circulates through the refrigerant circuit via refrigerant line 24 to and through the heat exchange tube coil or tube bank of the condenser heat exchanger 16, wherein the refrigerant vapor condenses to a liquid, thence through the receiver 36, which provides storage for excess liquid refrigerant, and thence through the subcooler coil 38 of the condenser. The subcooled liquid refrigerant then passes through refrigerant line 24 through a first refrigerant pass of the refrigerant-to-refrigerant heat exchanger 40, and thence traverses the expansion device 18 before passing through the evaporator heat exchanger 20. In traversing the expansion device 18, which may be an electronic expansion valve (EXV) as depicted in FIG. 1 or a mechanical thermostatic expansion valve (TXV) as depicted in FIG. 2, the liquid refrigerant is expanded to a lower temperature and lower pressure prior to passing to the evaporator heat exchanger 20.

In flowing through the heat exchange tube coil or tube bank of the evaporator heat exchanger 20, the refrigerant evaporates, and is typically superheated, as it passes in heat exchange relationship return air drawn from the cargo box passing through the airside pass of the evaporator heat exchanger 20. The refrigerant vapor thence passes through the refrigerant line 26, the refrigerant vapor traverses a second refrigerant pass of the refrigerant-to refrigerant heat exchanger 40 in heat exchange relationship with the liquid refrigerant passing through the first refrigerant pass thereof. Before entering the suction inlet of the compressor 14, the refrigerant vapor passes through the suction modulation valve 22 disposed in refrigerant line 26 downstream with respect to refrigerant flow of the refrigerant-to-refrigerant heat exchanger 40 and upstream with respect to refrigerant flow of the compressor 14. By selectively reducing the open flow area through the suction modulation valve 22, the controller 30 can selectively restrict the flow of refrigerant vapor supplied to the compressor 14, thereby reducing the capacity output of the transportation refrigeration unit 12 and in turn reducing the power demand imposed on the engine 32.

Air drawn from within the cargo box by the evaporator fan(s) (not shown) associated with the evaporator heat exchanger 20, is passed over the external heat transfer surface of the heat exchange tube coil or tube bank of the evaporator heat exchanger 20 and circulated back into the interior space of the cargo box. The air drawn from the cargo box is referred to as "return air" and the air circulated back into the cargo box is referred to as "supply air". It is to be understood that the term "air" as used herein includes mixtures of air and other gases, such as for example, but not limited to nitrogen or carbon dioxide, sometimes introduced into a refrigerated cargo box for transport of perishable product such as produce.

Although the particular type of evaporator heat exchanger 20 used is not limiting, the evaporator heat exchanger 20 may, for example, comprise one or more heat exchange tube coils, as depicted in the drawing, or one or more tube banks formed of a plurality of tubes extending between respective inlet and outlet manifolds. The tubes may be round tubes or flat tubes and may be finned or un-finned.

The compressor 14 may comprise a single-stage or multiple-stage compressor such as, for example, a reciprocating compressor as depicted in the exemplary embodiments shown in FIGS. 1 and 2. However, the compressor 14 may be a scroll compressor or other type of compressor as the particular type of compressor used is not germane to the disclosure. In the exemplary embodiment of FIG. 1, the compressor 14 comprises a reciprocating compressor having a compressing mechanism, an internal electric compressor motor and an interconnecting drive shaft that are all sealed within a common housing of the compressor 14. The diesel engine 32 drives an electric generator 42 that generates electrical power for driving the compressor motor, which in turn drives the compression mechanism of the compressor 14. The drive shaft of the diesel engine 32 drives the generator shaft. In the embodiment of FIG. 2, the compressor 14 is a reciprocating compressor having a compressing mechanism with a shaft driven directly by the drive shaft of the diesel engine 32, either through a direct mechanical coupling or through a belt drive 44 as illustrated in FIG. 2.

Figure 3:
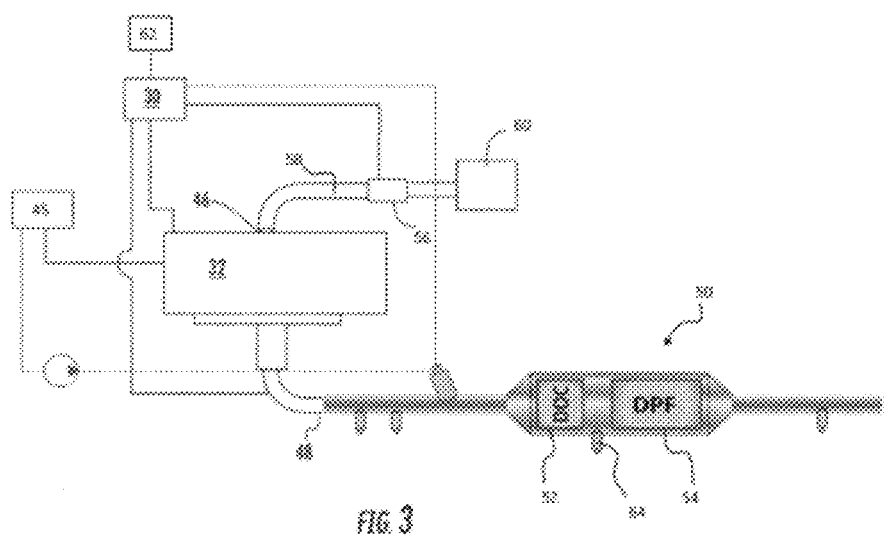
FIG. 3 is a schematic view of a portion of a transport refrigeration system.

Referring now to FIG. 3, the diesel engine 32 receives diesel fuel from a fuel supply 45 and air through an air inlet 46. After combustion in the diesel engine 32, the byproducts of combustion, exhaust gas including particulates such as soot and other materials, exits the diesel engine 32 via an exhaust system including an exhaust pipe defining an exhaust pathway 48, and an exhaust treatment unit 50 disposed in-line in the exhaust pipe. In the illustrated, non-limiting embodiment, the exhaust treatment unit 50, includes a diesel oxidation catalyst (DOC) 52 and a diesel particulate filter (DPF) 54 provided along the exhaust pathway 48. The DOC 52 is configured to break down the exhaust pollutants into less harmful substances, such as carbon dioxide and water for example, and the DPF 54 is configured to remove the particulates from the exhaust gas prior to the exhaust gas reaching the ambient atmosphere.

Periodic regeneration of the DPF 54 is performed to remove accumulated soot and organic particles from the filter substrate. Regeneration of the DPF 54 is accomplished using an elevated temperature of the exhaust gas to burn the particles, thus removing the particulates from within the DPF 54. To initiate regeneration of the DPF 54, it is necessary for the exhaust gas entering the DOC 52 to be at a temperature of at least 290° C. for the catalytic coating on the DOC 52 to become active. It should be understood that the temperatures included herein are intended as examples, and that the activation temperature of the DOC 52 depends on multiple factors, including, but not limited to a concentration of precious metals within the DOC 52 for example.

To ensure that the exhaust gas is at the necessary temperature, especially when the diesel engine 32 is operating at low speeds and/or low loads, an air control valve 56 is located in an air intake pathway 58 upstream of the air inlet 46 of the diesel engine 32. In some embodiments, the air control valve 56 is located between an engine air cleaner 60 and the air inlet 46, and may be, for example, an electronic or mechanically operated valve. The air control valve 56 is connected to the system controller 30, which may use information, such as diesel engine 32 speed, system load, and/or exhaust gas temperature for example, to control the position of the air control valve 56 and the amount of air flowing there through and into the air inlet 46.

In operation, when the air control valve 56 is moved toward a closed position, the exhaust gas temperature output from each cylinder of the diesel engine 32 and entering the exhaust treatment unit 50 increases. When regeneration of the DPF 54 is desired or required, the controller 30 determines the position of the air control valve 56 required for the exhaust gas to meet or exceed the selected activation temperature of the DOC 52, and adjusts the air control valve 56 accordingly. The air control valve 56 is positioned such that the selected temperature is reached, but airflow into the air inlet 46 is not overly restricted resulting in engine stall.

The controller 30 may be configured to initiate regeneration of the DPF 54 automatically. In one embodiment, the controller 30 initiates a regeneration at a predetermined interval of time, such as every hour for example, as monitored by a timing mechanism 62 operably coupled thereto. The timing mechanism 62 may be arranged external to or may be integrally formed with the controller 30. In another embodiment, the controller 30 may be configured to initiate a regeneration based on a sensed parameter, for example back pressure within the exhaust pathway 48.

One or more sensors are arranged downstream from the diesel engine 32 within the exhaust pathway 48. As shown in FIG. 3, a temperature sensor 64 is located generally downstream from the DOC 52. The temperature sensor 64 may be arranged within the exhaust treatment unit 50, such as between the DOC 52 and the DPF 54. As shown, the temperature sensor 64 is configured to periodically or continuously monitor a temperature of the exhaust gas of the DOC 52 within the exhaust pathway 48.

Figure 4:
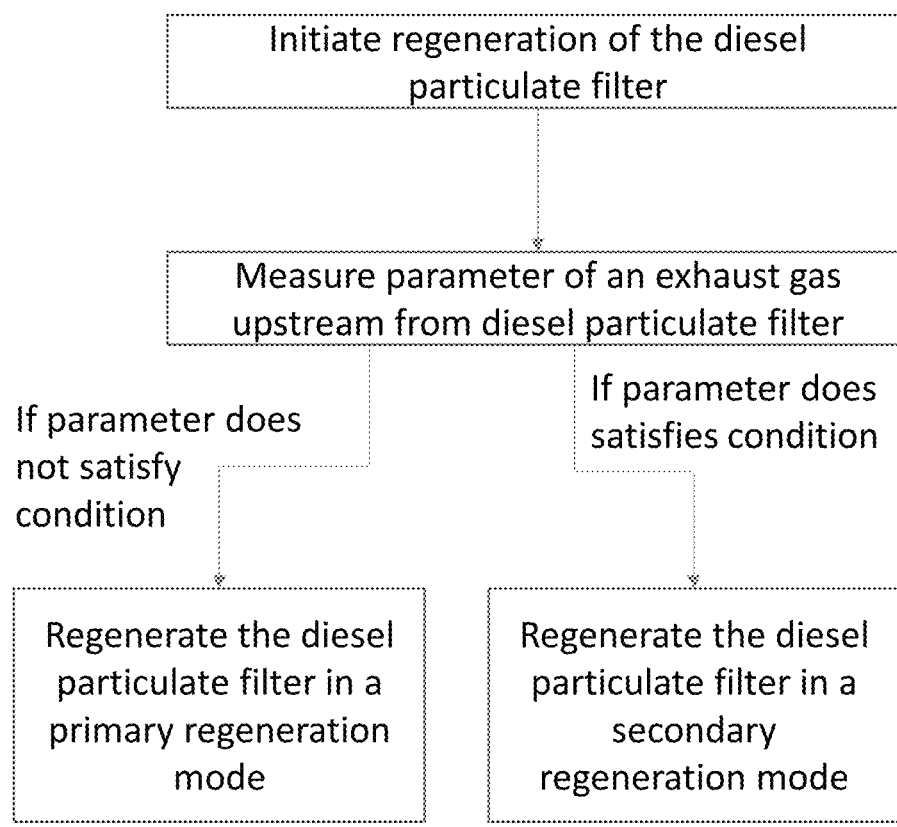
FIG. 4 is a schematic diagram illustrating a method for regenerating a diesel particulate filter of an exhaust treatment unit of a transport refrigeration system.

With reference to FIG. 4, once regeneration of the DPF 54 is initiated, the controller 30 is configured to operate in a primary regeneration mode by injecting additional fuel into the exhaust manifold, upstream of the DOC 52. The injected fuel is oxidized by the catalytic materials within the DOC 52 to increase the exhaust gas temperature. In the primary regeneration mode, the controller 30 may also adjust the position of the air control valve 56 to restrict engine air, for example if the temperature measured by the temperature sensor 64 is less than a predetermined threshold of at least 290° C. As a result, the engine 32 will naturally respond by injecting additional fuel in order to maintain engine speed. Together, the air control valve 56 and the addition of fuel are used to achieve an exhaust gas having a temperature sufficient to meet or exceed the desired regeneration temperature.

Alternatively, once regeneration of the DPF 54 is initiated, if the temperature sensed by sensor 64 or the rate of temperature change calculated therefrom satisfies a predetermined condition, the controller 30 is configured to operate in a secondary regeneration mode. In one embodiment, the predetermined condition is satisfied if the temperature is above 450° C. or the rate of temperature change is at least equal to about 3° C./second. In the secondary regeneration mode, the controller 30 is configured to regenerate the DPF 54 using only the air control valve 56. Upon detection of the predetermined condition, the controller 30 determines a desired position of the air control valve 56 and adjusts the position of the air control valve 56 to drastically reduce the volume of air provided to the diesel engine 32, thereby achieving an exhaust gas having a temperature sufficient to meet or exceed the desired regeneration temperature.

As the exhaust gas flows through the DPF 54, the soot accumulated therein is at least partially incinerated as the DPF 54 is regenerated. The air control valve 56 may be held in that position for a predetermined period of time, such as monitored by the timing mechanism 62 for example. Alternatively, the air control valve 56 may be held in that position until the sensed temperature, or rate of temperature change calculated therefrom achieves a second predetermined condition stored within the controller to indicate that the regeneration of the DPF 54 is complete.

By modifying the logic of the controller 30 to select between these modes of regeneration, the DPF 54, the fuel used to regenerate the engine emissions systems in moderate to low temperature ambient conditions is reduced. These revisions also improve the regeneration process by improving control of the temperature of the diesel particulate filter at low ambient temperatures and reduced engine mass flow conditions.

While the disclosure has been provided in detail in connection with only a limited number of embodiments, it should be readily understood that the disclosure is not limited to such disclosed embodiments. Rather, embodiments can be modified to incorporate any number of variations, alterations, substitutions or equivalent arrangements not heretofore described, but which are commensurate with the spirit and scope of the disclosure. Additionally, while various embodiments have been described, it is to be understood that aspects may include only some of the described embodiments. Accordingly, the disclosure is not to be seen as limited by the foregoing description, but is only limited by the scope of the appended claims.

The invention claimed is:

1. A transport refrigeration system including a refrigeration unit comprising:
   a diesel engine having an exhaust system for discharging engine exhaust from the diesel engine;

an exhaust treatment unit disposed in the diesel engine exhaust system, the exhaust treatment unit including a diesel oxidation catalyst and a diesel particulate filter;

an air control valve configured to control a quantity of air provided to the diesel engine from an air supply fluidly coupled to the diesel engine; and a controller operably coupled to the air control valve, wherein the controller is configured to operate the system in one of a primary regeneration mode and a secondary regeneration mode in response to a temperature condition monitored within the exhaust treatment unit, wherein the temperature condition is a rate of temperature change of the exhaust gas upstream from the diesel particulate filter and the secondary regeneration mode is used if the rate of temperature change satisfies a predetermined condition, wherein in the secondary regeneration mode, the diesel particulate filter is regenerated using only the air control valve.

2. The system according to claim 1, wherein the primary regeneration mode includes injection of additional fuel upstream of the diesel oxidation catalyst and includes adjusting a position of the air control valve if the temperature condition is below a predetermined threshold.

3. The system according to claim 1, wherein the exhaust treatment unit includes a sensor for monitoring the temperature condition within the exhaust treatment unit, the sensor being positioned downstream from the diesel oxidation catalyst.

4. The system according to claim 1, wherein the temperature condition within the exhaust treatment unit is a rate of temperature change of exhaust gas output from the diesel oxidation catalyst.

5. The system according to claim 1, wherein if the rate of temperature change is at least equal to about 3° C./s, the controller is configured to operate in the secondary regeneration mode.

6. The system according to claim 3, wherein the temperature condition within the exhaust treatment unit further includes a temperature of exhaust gas located upstream from the diesel particulate filter.

7. The system according to claim 6, wherein the temperature condition is satisfied if the temperature is at least equal to 450° C.

8. A method of regenerating a diesel particulate filter of an exhaust treatment unit, comprising
sensing a temperature of an exhaust gas upstream from the diesel particulate filter after regeneration of the diesel particulate filter is initiated;
calculating a rate of temperature change of the exhaust gas upstream from the diesel particulate filter;
regenerating the diesel particulate filter in a primary regeneration mode when rate of temperature change does not satisfy a predetermined condition; and
regenerating the diesel particulate filter in a secondary regeneration mode when the rate of temperature change satisfies the predetermined condition, wherein in the secondary regeneration mode, a temperature of exhaust gas is controlled via only adjusting a position of an air control valve.

9. The method according to claim 8, wherein the rate of temperature satisfies the predetermined condition if the rate of temperature change is at least equal to about 3° C./s.

10. The method according to claim 8, wherein operation in the primary regeneration mode includes injecting fuel upstream of the diesel particulate filter.

* * * * *